Jan. 17, 1956  R. D. BIBBY  2,730,760
EXTRUSION APPARATUS
Filed Oct. 6, 1954  8 Sheets-Sheet 2

FIG. 2.

INVENTOR
*Ralph Dolman Bibby*

BY
*Cushman, Darby & Cushman*
ATTORNEYS

Jan. 17, 1956 R. D. BIBBY 2,730,760
EXTRUSION APPARATUS
Filed Oct. 6, 1954 8 Sheets-Sheet 3

INVENTOR
*Ralph Dolman Bibby*

BY *Cushman, Derby & Cushman*
ATTORNEYS

Jan. 17, 1956  R. D. BIBBY  2,730,760
EXTRUSION APPARATUS
Filed Oct. 6, 1954  8 Sheets-Sheet 6

INVENTOR
Ralph Dolman Bibby
BY
Cushman, Darby & Cushman
ATTORNEYS

Jan. 17, 1956  R. D. BIBBY  2,730,760
EXTRUSION APPARATUS
Filed Oct. 6, 1954  8 Sheets-Sheet 7

INVENTOR
Ralph Dolman Bibby
BY
Cushman, Darby & Cushman
ATTORNEYS

United States Patent Office 2,730,760
Patented Jan. 17, 1956

2,730,760

EXTRUSION APPARATUS

Ralph D. Bibby, Altavista, Va., assignor to The Lane Company, Inc., Altavista, Va., a corporation of Virginia Application October 6, 1954, Serial No. 460,570

20 Claims. (Cl. 18—12)

This invention relates to extrusion apparatus, and particularly to apparatus for the manufacture of boards and similar shapes from comminuted material and binder, commonly known as chipboard.

A principal object of the invention is to provide novel and improved apparatus particularly adapted for the efficient conversion of wood chips and thermosetting resin binder into board or similar shapes, adapted for use as furniture panels, building elements and the like.

Another object of the invention is to provide apparatus adapted to extrude comminuted material and binder at high rate, with minimum power consumption and outstanding dimensional control.

A further object is to provide board extrusion apparatus readily adjustable to produce a wide range of products, varying in width, thickness and density.

Still another object is to provide extrusion apparatus adapted to maintain product uniformity in continuous operation, including means readily adjustable to compensate for variations in character and condition of feed material and other variables.

A particular object is to provide in an extrusion apparatus a novel high inertia ram drive, including means for varying the ram stroke. Further objects will be in part evident and in part pointed out hereinafter.

The invention and the novel features thereof may best be made clear from the following description and the accompanying drawings, in which.

Figure 1:
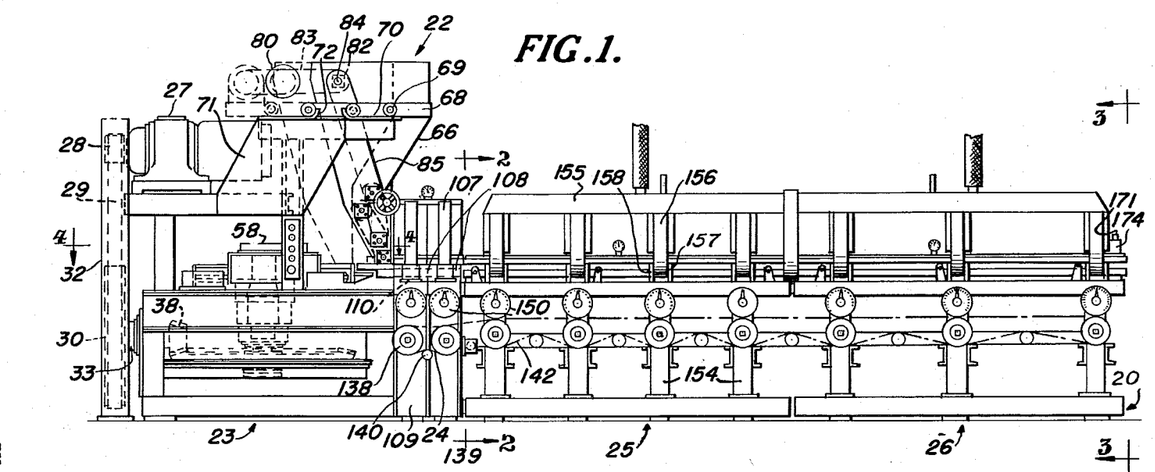
Figure 1 is a side elevational view of a preferred embodiment of the invention.

Referring to the drawings in detail, the exemplary embodiment illustrated in Figure 1 includes a frame 20 mounting a feed hopper 22 and the various sections of the machine indicated generally as ram drive section 23, forming section 24, intermediate curing section 25 and front curing section 26.

Figure 5:
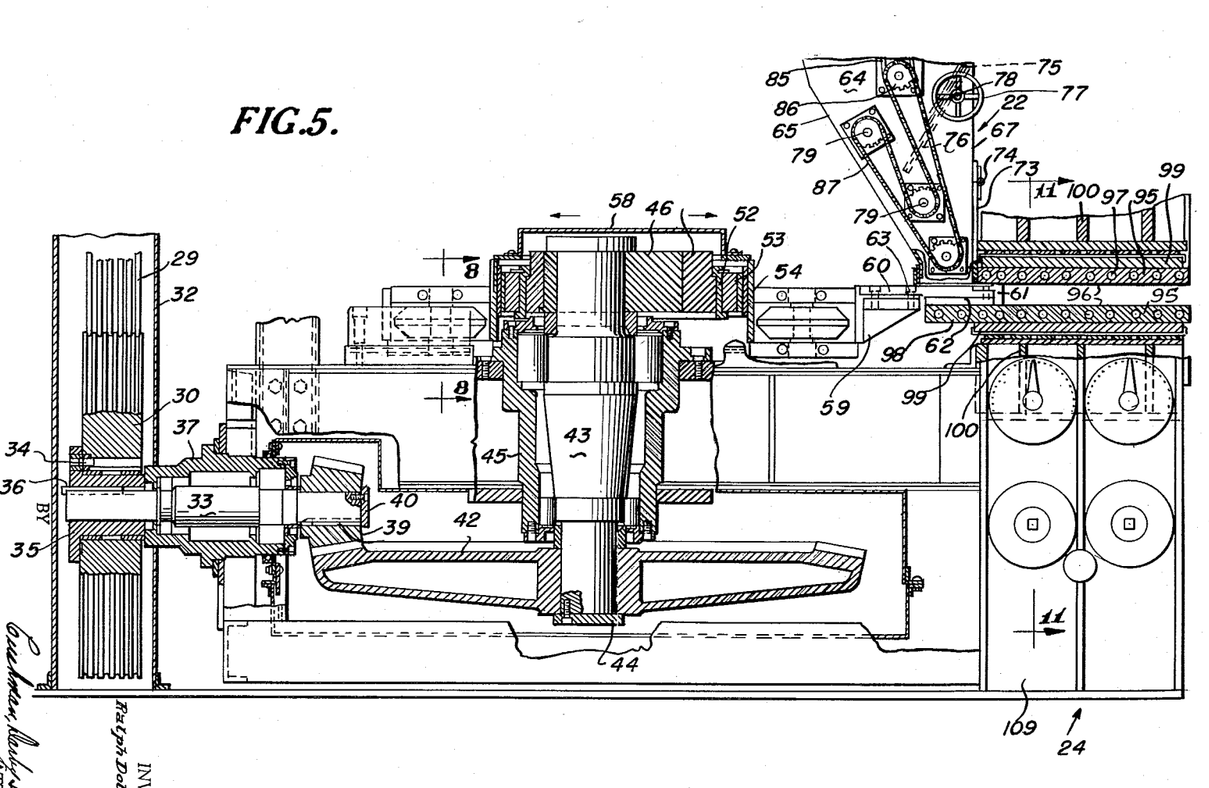
Figure 5 is an elevational sectional view of the ram drive mechanism, taken on the line 5—5 of Figure 4.

Power for the ram drive is supplied by a heavy duty motor 27, driving pulley 28 which is linked by V belts 29 to flywheel 30. The flywheel 30 is desirably of heavy construction and accordingly high inertia, and may be constructed of solid metal, as indicated in Figure 5. The motor pulley 28, V belts 29 and flywheel 30 are enclosed by a suitable guard 32, as shown.

The flywheel 30 is fixedly mounted in suitable manner on the end of a horizontally disposed shaft 33. As illustrated in Figure 5, the flywheel is fixed by pin 34 to a retainer collar 35, which in turn is secured to the shaft 33 by means of a key 36. The shaft 33 extends through and is rotatably supported in a suitable heavy bearing 37, mounted in frame 20, and carries at its opposite end a bevel pinion 38, fixedly secured thereto by key 39 and retained by plate 40.

Figure 4:
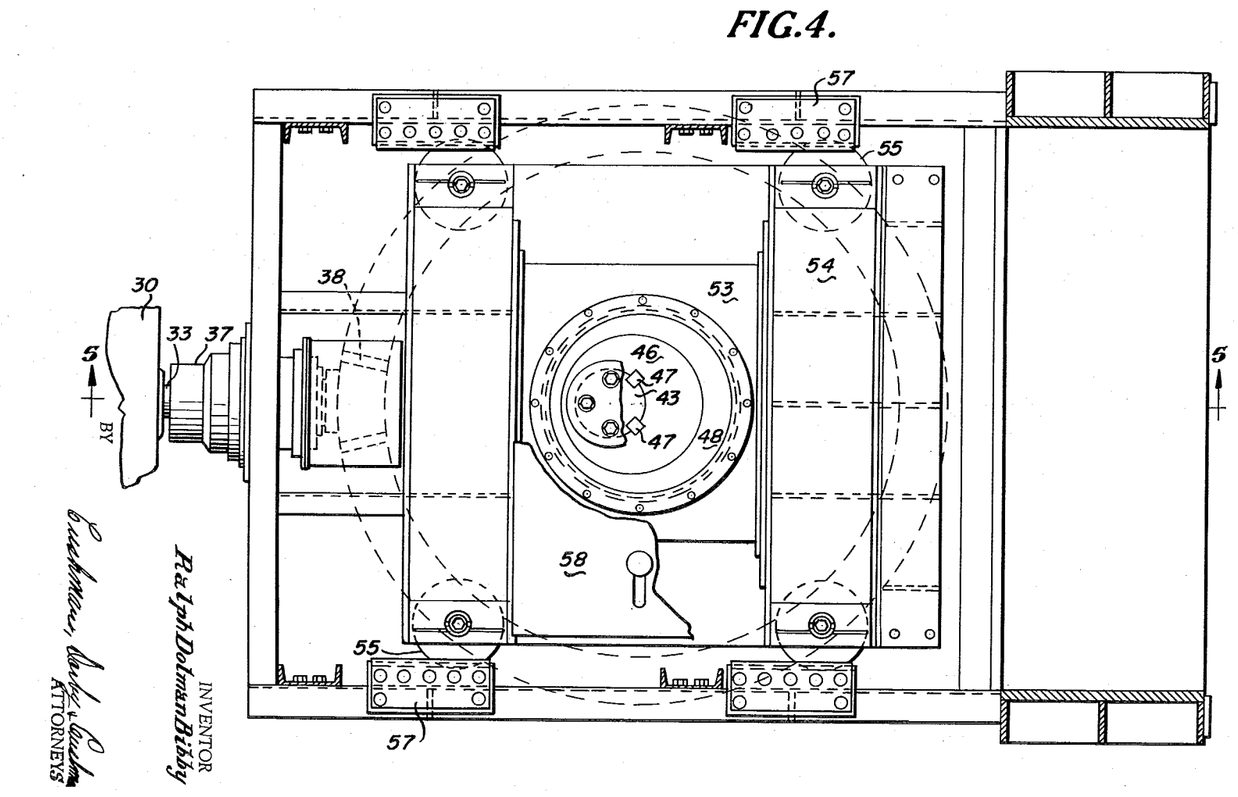
Figure 4 is a plan view of the ram drive mechanism of the device, taken substantially on the line 4—4 of Figure 1.

The bevel pinion is drivingly engaged to a large diameter bevel gear 42, which is fixed to the bottom end of a vertically disposed drive shaft 43 and retained thereon by plate 44. The drive shaft is supported in the heavy duty bearing 45 mounted in the frame, and carries on its upper end an eccentric 46, which is fixed thereto as by wedges 47, see Figure 4.

Figure 6:
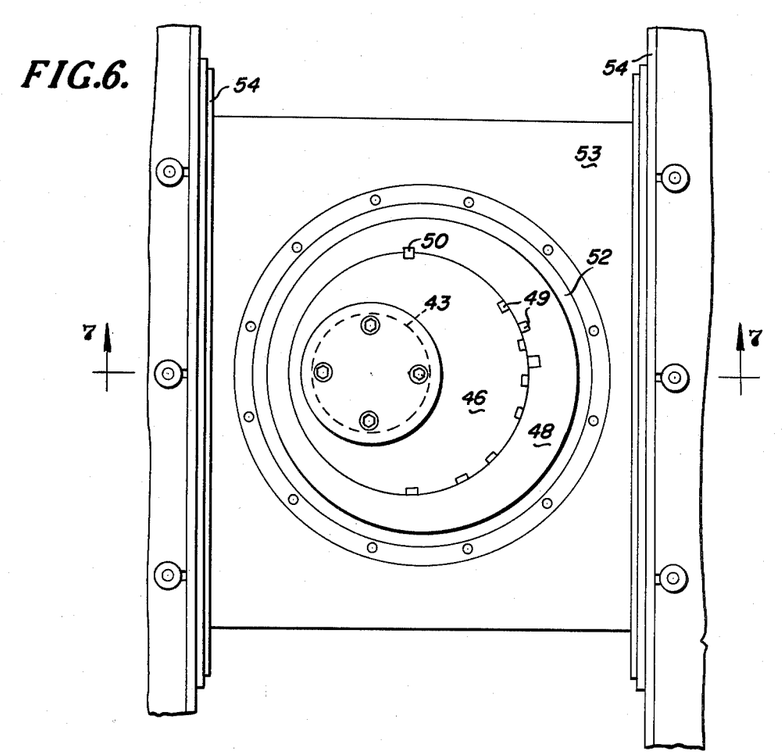
Figure 6 is a plan view of the eccentric and crosshead assembly of the ram drive.
Figure 7:
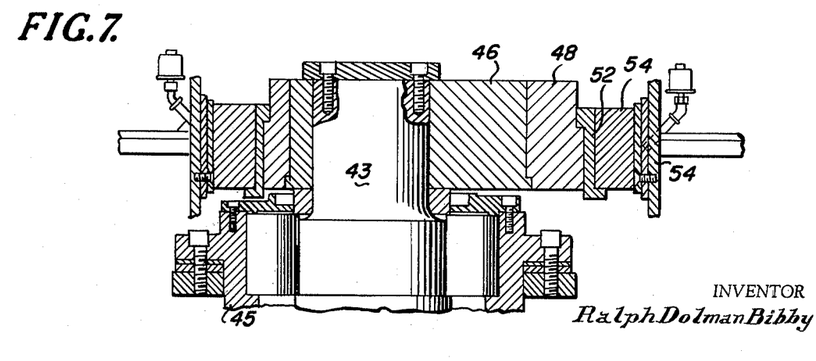
Figure 7 is a sectional view taken on the line 7—7 of Figure 6.
Figure 8:
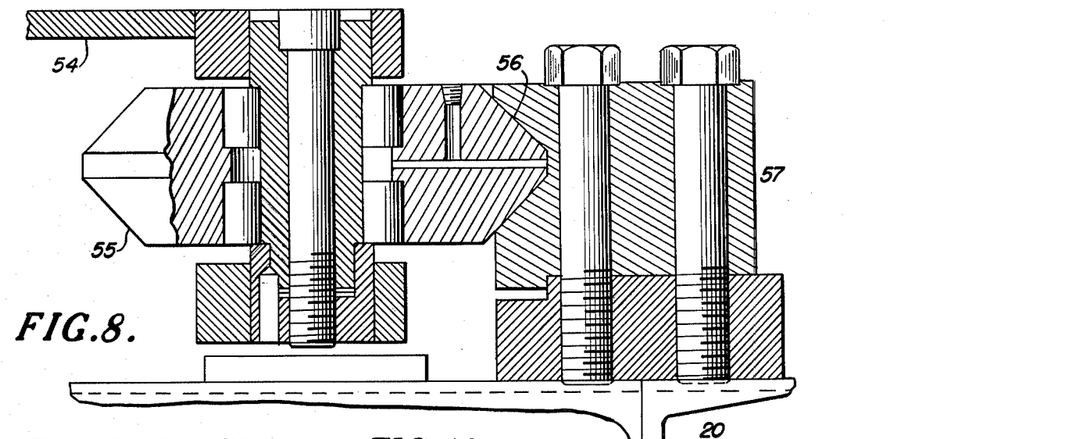
Figure 8 is a sectional view, on enlarged scale, taken on the line 8—8 of Figure 5, showing details of the crosshead guides and guide wheels.

As best illustrated in Figures 6 and 7, the eccentric 46 is enclosed by an outer eccentric 48, the eccentrics being slotted at intervals at 49 to provide for a variety of relative adjustments, in any of which they may be fixed by a key or wedge 50. The outer eccentric 48 is rotatably mounted in a bushing 52 enclosed by a slide 53, which slide is transversely slidable in a longitudinally movable crosshead 54. The crosshead is provided with guide wheels 55 (see Figures 4 and 8), adapted to ride in the V grooves 56 of the crosshead guides 57, rigidly mounted on the frame. A suitable guard 58 is provided atop the crosshead, to cover the slide 53 and the rotating eccentrics.

As best shown in Figure 5, the forward end of the crosshead carries a bracket 59 adapted to support a ram plate 60, positioned to reciprocate below the feed hopper 22 into the forming section 24. To the forward end of the ram plate is affixed a head 61 and to its underside may be secured a suitable slide spacer 62.

The ram head 61, it will be understood, is reciprocated from the extreme forward position shown in Figure 5 to a rearward position below the throat 63 of feed hopper 22. The feed hopper is adapted to receive a mixture of comminuted material and binder from a mixing and supply apparatus not shown, and to deliver the material positively and uniformly to the hopper throat 63. As shown in Figures 1 and 5, the feed hopper comprises side walls 64, an inwardly sloping rear wall 65, and an inwardly sloping front wall 66 which merges into the vertical transverse portion 67 adjoining the forming section of the machine. The hopper is rigidified and supported as a unit by a subframe 68, which is movably mounted by means of wheels 69 on tracks 70, which in turn are supported by a frame extension 71. The inner ends of tracks 70 are upturned at 72, to limit the travel of the hopper in both directions. By these means, the hopper may be readily moved as a unit from the normal operative position illustrated by solid lines in Figure 1 rearwardly to the dotted line position there indicated, when necessary to clean or clear the machine. Also for clearing and cleaning, the lower end of front wall portion 67 is formed by a gate 73, hinged to the hopper portion 67 at 74.

The interior of the hopper is provided with a plate 75 constituting a continuation of front wall 66, and an extension plate 76 slidably connected thereto in any conventional fashion, so that the extension plate may be moved with respect to plate 75 to controllably vary the opening passage between the outer edge of the extension plate and the opposite rear wall 65, to control the feed to the lower throat portion of the hopper. Provision is made to retract and extend the extension plate 75 from the exterior of the hopper, conveniently by means of a hand wheel 77, which may be utilized to turn shaft 78, and thereby effect sliding movement of the extension plate as by a rack and pinion (not shown).

To maintain uniform the consistency of the material feed in the hopper, and direct it in positive and uniform fashion to the hopper throat, without undue compaction or creation of air pockets, a plurality of rotary feed members 79 extend laterally through the hopper. The feed members are driven by an electric motor 80 mounted on the hopper subframe 68, which drives a sprocket 82 by means of a chain or belt 83. From sprocket 82 and jack shaft 84, the drive is transmitted through chain 85 to a sprocket engaged to the uppermost feed member 79. As best shown in Figure 5, the uppermost feed member is drivingly engaged through its sprocket 86 and a chain 87 to similar sprockets fixed to the ends of the other feed members. As will be apparent, the feed members are connected to rotate in different directions.

Figures 14, 15:
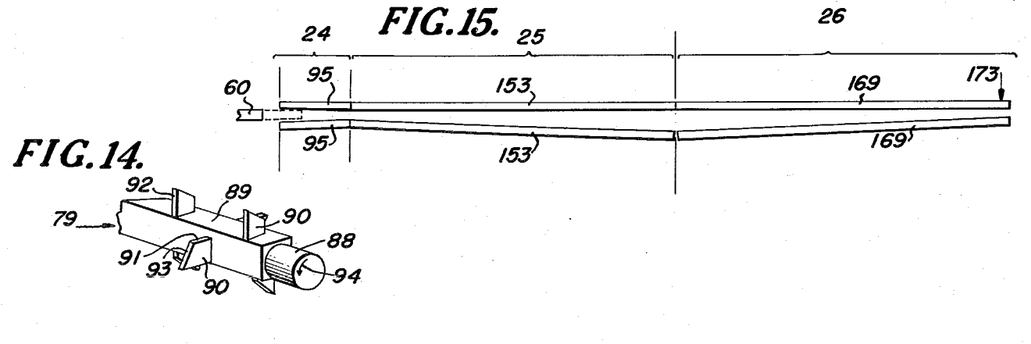
Figure 14 is an isometric view of an agitating and feeding element utilized in the feed hopper.
Figure 15 is a diagrammatic view illustrating the platen relationship of the machine.

The configuration of the feed members is found to have considerable effect upon the material feed. A preferred type of feed member found most useful in feeding material of this nature is illustrated in Figure 14, and comprises at each end an end portion 88 extending through and journalled in the hopper side wall 64, and an intermediate section 89 of square cross-sectional configuration. From the intermediate section 89 extends a plurality of blades 90, each comprising opposite faces 91 and 92, and an inwardly sloping outer end surface 93. For optimum operation, it is desirable that at least the upper feed members rotate facing in the direction indicated by arrow 94, with the longer faces 92 of the blades 90 working the material, to agitate and work the material most effectively. The lower feed members, adjacent the hopper throat, may face oppositely in rotation, whereby the shorter faces 91 and the sloping outer end surfaces 93 engage and work the material, and force the feed downwardly. The feed member blades are fixed to the intermediate section 89 in offset or staggered relationship as shown, and when rotated in proper direction feed the comminuted material and binder uniformly, positively and without compaction.

The material is forced by the ram from the feed hopper throat into forming section 24 of the machine. Referring again to Figure 5, the forming section includes relatively short upper and lower platens 95, disposed in substantially parallel, spaced relationship. The platens 95, desirably, are finished on their facing surfaces 96 with chromium, or otherwise formed and treated to reduce friction, and may be provided with internal passages 97 for heating fluid. As will be evident, electrical, electronic, radio frequency or other conventional heating means may be provided to apply heat to the platens, or to the material therebetween. The lower platen 95 extends rearwardly beyond the upper platen and below the feed hopper throat, its extended rear end 98 constituting a slide bearing for the ram.

Figure 13:
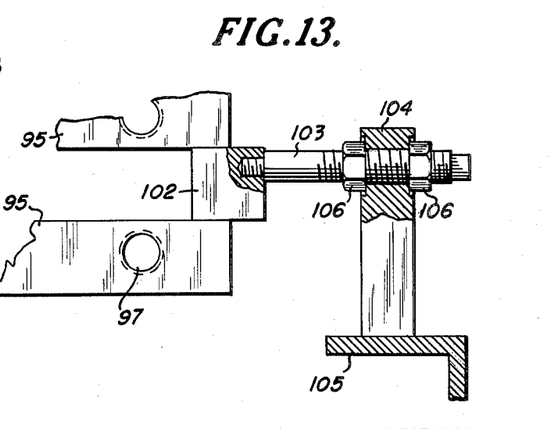
Figure 13 is a fragmentary view illustrating the adjustable mounting of an edge former between platens.

The platens 95 are backed by insulating layers 99, which in turn are supported by head structures 100. Between the platens and adjacent each side thereof is mounted a longitudinally extending edge former member 102. An exemplary edge former, as illustrated in Figure 13, may be a block of metal extending the length of the platens, and defining therewith a rectangular forming passage. The provision is made to laterally adjust each edge former, for alignment thereof and to vary the width of the forming passage, as by means of threaded rods 103 extending outwardly at spaced points from each edge former, through correspondingly apertured lugs 104, which may be rigidly mounted on frame elements 105. By means of lock nuts 106, the lateral disposition of the rods and edge former may be readily adjusted and fixed in desired relationship.

The upper platen 95 of the forming section is rigidly supported by the machine frame, by means of the yoke arms 107 (Figure 1) which extend downwardly from both sides of the head structure 100 to and between lugs 108 mounted atop the frame standards 109, and to which they are engaged by removable pins 110. The upper head structure and associated elements may be disengaged and pivotally elevated as a unit when necessary for inspection, cleaning, clearing stoppages or the like, merely by removing the pins 110 on one side and then utilizing the pins 110 on the other side as pivots.

Figure 11:
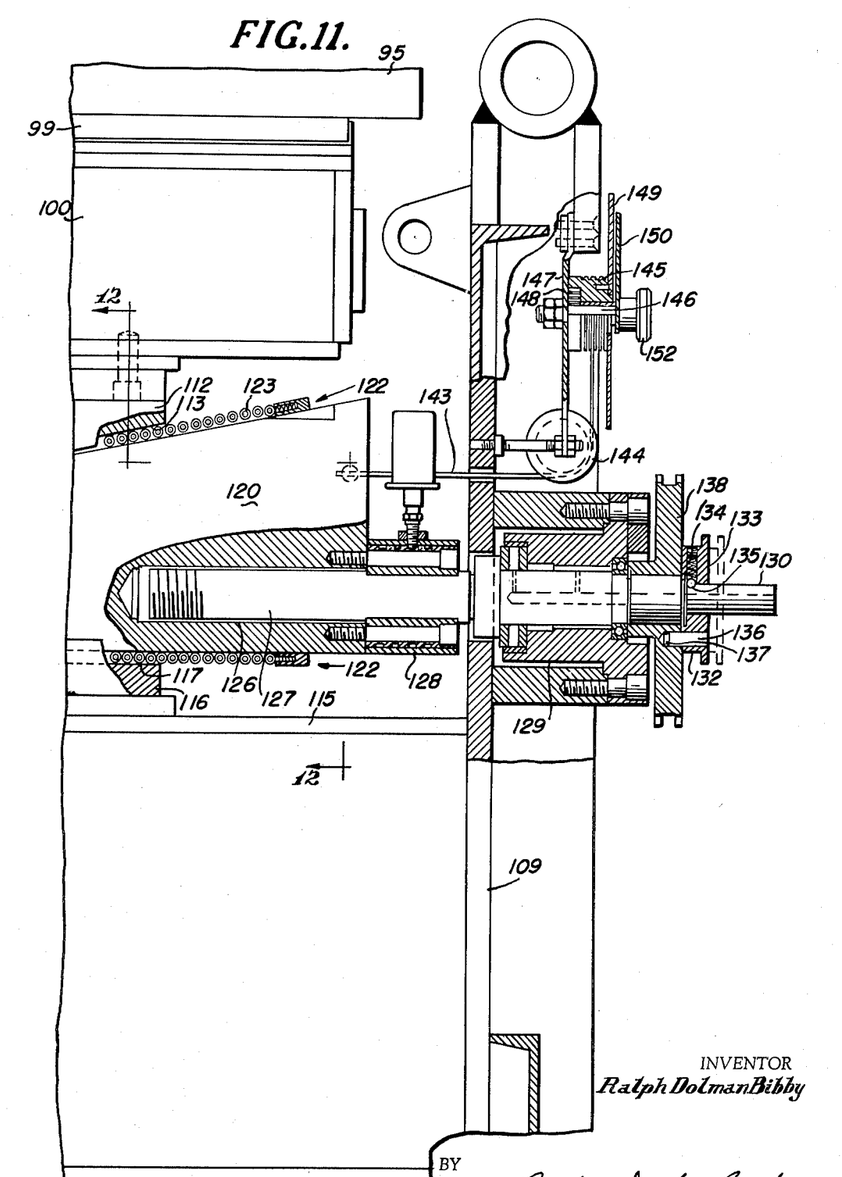
Figure 11 is a sectional view taken on the line 11—11 of Figure 5 showing details of the vertical adjustment means of the forming section.
Figure 12:
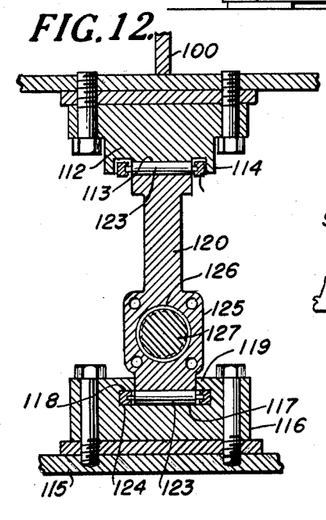
Figure 12 is a sectional view taken along the line 12—12 of Figure 11.

The lower platen 95 is adjustably supported along two longitudinally spaced transverse lines, corresponding substantially to the center lines of frame standards 109. Referring to Figures 11 and 12, the lower head structure 100 is provided with two transversely spaced pairs of bearing blocks 112, the lower bearing surfaces 113 of which are acutely angulated with respect to the horizontal and coplanar with each other. Each bearing surface 113 is adjoined on either side by downwardly extending retaining flanges 114. Directly below each pair of bearing blocks 112, a transverse frame support 115 mounts a pair of correspondingly spaced bearing blocks 116, the upper bearing surfaces 117 of which are disposed in a common horizontal plane. Laterally of the bearing surfaces 117, the bearing blocks 116 are formed into grooves 118 and inwardly extending retaining flanges 119 (Figure 12). Between each set of bearing blocks 112 and 116 is disposed a wedge 120, and interposed between each wedge and its cooperative bearing blocks both above and below is a ladder bearing 122, comprising a plurality of rollers 123 retained by side bars 124.

Lateral movement of the wedges 120, it will be evident, is effective to vary the vertical position of the head structure and platen thereabove, and means are provided to finely and individually adjust the transverse position of each wedge. As illustrated in Figures 11 and 12, each wedge 120 is enlarged at 125. The enlarged wedge portion 125 is transversely bored at 126 and thereby threadably engaged to an adjustment shaft 127, which extends therefrom through a lubricating collar 128 and the aligned frame standard 109. Shaft 127 is rotatably supported and axially restrained in the frame standard mounted bearing 129, and outwardly thereof formed into an end portion 130 of square cross-sectional configuration, whereon a dog 132 is non-rotatably mounted. The dog 132 contains a ball 133 biased inwardly by spring 134, and adapted to engage alternatively one or the other of ball detents 135, provided in the surface of the shaft end portion 130. In this manner the dog may be temporarily engaged at either the solid line or the dotted line position of Figure 11.

The dog 132 also carries a laterally extending pin 136, adapted, when the dog is in the solid line position, to engage a bore 137 of drive wheel 138, which is rotatably mounted on the adjacent cylindrical inner portion of the shaft. As indicated in Figure 1, the drive wheels 138 of the forming section may be operatively joined together by means of a chain 139, engaging the toothed peripheries of the drive wheels and an idler 140. By means of another chain 142, the drive wheels 138 of the forming section may be similarly engaged to corresponding drive wheels of the curing sections 25 and 26.

Figure 9:
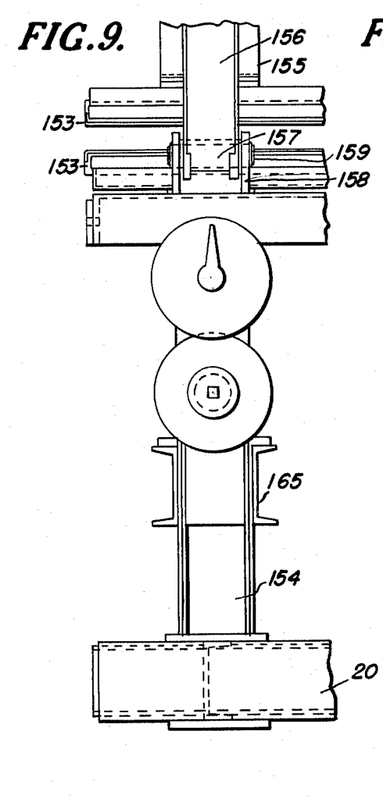
Figure 9 is an elevational view, on enlarged scale, of a typical curing section frame standard, mounting means for adjusting and indicating the vertical position of the lower platen thereof.
Figure 10:
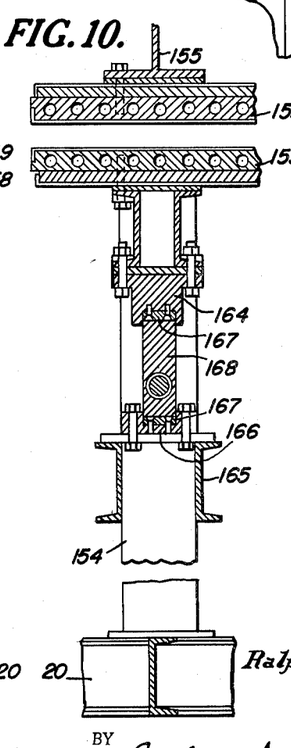
Figure 10 is a sectional view taken along the line 10—10 of Figure 2, showing details of the vertical adjustment means.

To continuously indicate the position of the wedge at each station, or the corresponding vertical position of the lower platen, a flexible cable or cord 143 extends from the wedge around a pulley 144 to a winding drum 145, which may be rotatably mounted on a shaft 146 suitably supported as by frame bracket 147. The winding drum 145 is biased constantly in winding direction by a spiral spring 148, engaged to both the shaft 146 and the drum 145, whereby slack in the cord 143 is prevented. To the outer face of drum 145 is fixed an indicator dial 149, provided with suitable indicia to indicate, in conjunction with a pointer 150 frictionally engaged to shaft 146, the relative positions of the wedge and lower platen. A small hand knob 152 may be attached to the pointer 150, to facilitate adjustment thereof.

Figure 2:
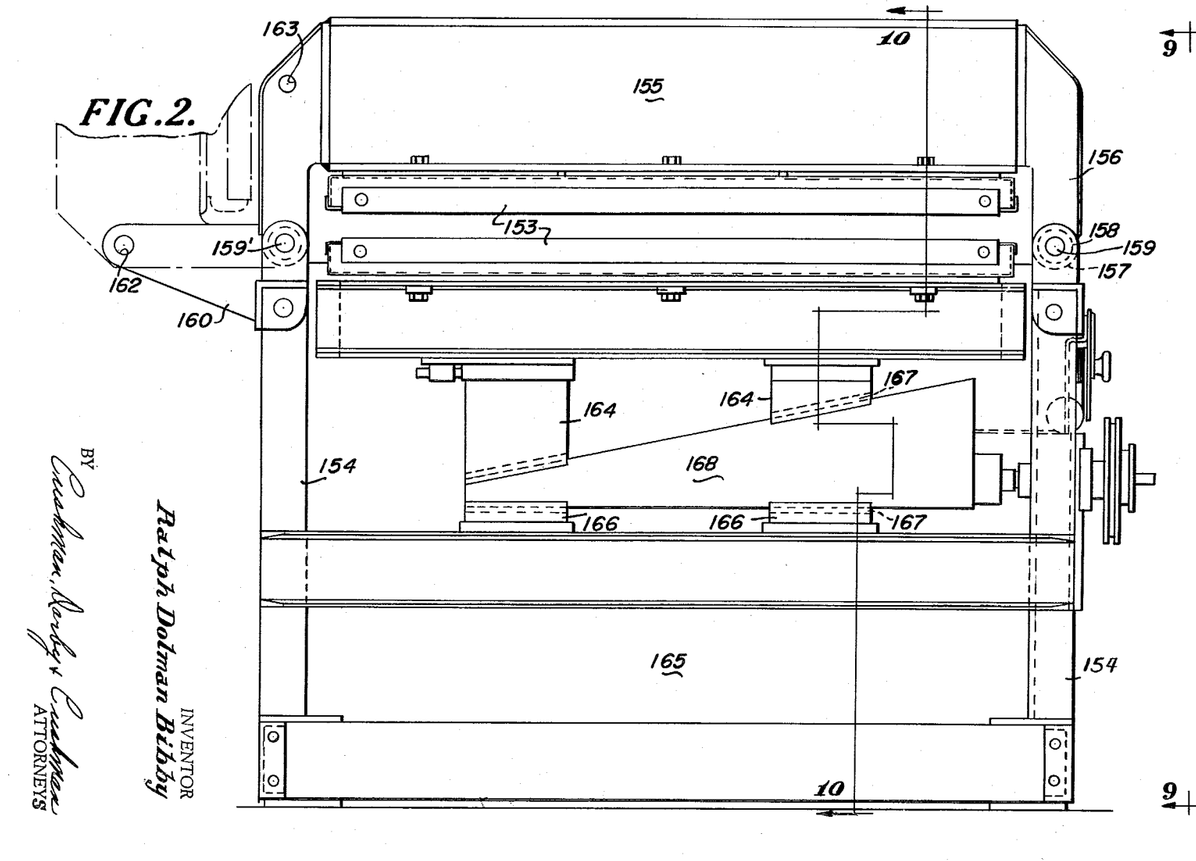
Figure 2 is an end elevational view of the intermediate curing section of the apparatus, viewed as indicated by the line 2—2 of Figure 1.

Referring to Figures 1 and 2, the intermediate curing section 25 corresponds substantially in structure to the forming section, being, however, of considerably greater length. The head structures backing the platens 153 thereof are supported by four equally spaced frame standards 154. The upper head structure 155 carries on each side thereof downwardly extending yoke arms 156, each of which terminates in a socket 157 disposed between a pair of apertured lugs 158 extending from the frame standards. Normally, each socket 157 is detachably engaged to the corresponding lugs 158 by a removable pin 159. As in the case of the upper head structure 100 of the forming section, the upper head structures of the curing sections are adapted to be pivoted upwardly, simply by removing the pins 159 along one side and utilizing the pins on the other side as pivots. To support and temporarily engage the head structures in elevated position, during cleaning or other work, brackets 160 may extend outwardly from the frame standards. As illustrated in Figure 2, the brackets 160 and the adjacent yoke arms may be correspondingly apertured at 162 and 163, whereby the upper head structure may be temporarily supported by pins, when pivoted upwardly 90° about the pivot pins 159' on that side. The supported open position of upper head structure 155 is indicated in Figure 2 by dotted lines.

As in the case of the forming section, the lower platen 153 of the intermediate curing section is adjustably supported along a plurality of longitudinally spaced transverse lines, corresponding substantially to the center lines of frame standards 154. As shown in Figure 2, at each adjustable support station the lower head structure 155 is supported by two transversely spaced bearing blocks 164, and the frame element 165 supports therebelow a correspondingly spaced pair of bearing blocks 166. Since the forces involved are not so great as in the forming section, the bearing blocks 164 and 166 may be merely faced with suitable metal bearing plates 167, against which the faces of the wedge 168 directly bear. The bearing plates in this instance replace the ladder bearings 122 provided in the forming section.

Figure 3:
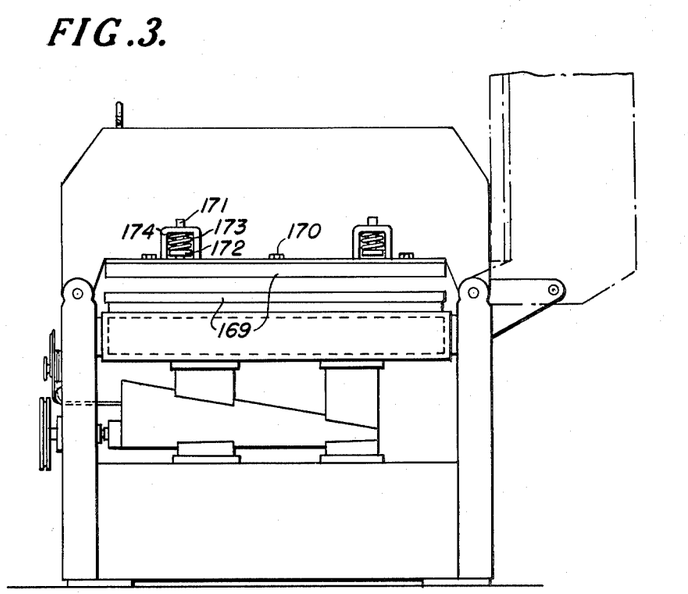
Figure 3 is an end elevational view of the front curing section of the apparatus, viewed as indicated by the line 3—3 of Figure 1.

The front curing section 26 mounts upper and lower platens 169, which corresponds substantially in length to the intermediate platens 153. The front curing section corresponds generally in structure and detail to the intermediate curing section previously described, although three frame standards suffice for support and adjustment thereof. Means are provided, however, for resiliently biasing the trailing end of the upper platen downwardly, for a purpose presently to be described. The rear row of bolts 170 holding the platen to the upper head structure (Figure 3) may be left loose, to permit downward deflection of the trailing half of the platen a limited distance, and any conventional means such as pneumatic cylinders may be provided to continuously and resiliently press downwardly on the trailing platen end. In the illustrated embodiment (Figures 1 and 3), rods 171 extend upwardly from the trailing end of upper platen 169 through the upper head structure, and carry collars 172 threadably engaged thereto. A heavy coil spring 173 encloses each rod 171, and is compressed between the rod collar and a U-shaped retainer 174 mounted on the head structure. The outer end of the rod extends through the retainer and serves as a guide, and the spring, as will be evident, continuously exerts downward deflecting force on the platen end. The deflecting force of the springs 173 may be readily varied by threadable adjustment of the collars 172 on rods 171, thereby varying the preloading of the springs. Alternatively, similar means may be provided to upwardly deflect the trailing end of the lower platen, or both platen ends may be resiliently biased inwardly.

Operation of the apparatus will now be described in detail. Comminuted material is mixed and fed continuously to the feed hopper 22 by separate apparatus, not shown. A preferred material comprises chips of mixed hard and soft woods, an a thermosetting binder such as urea-formaldehyde resin as chief ingredients. Additives, such as flour as a binder extender, lubricants and the like may also be included. While not limited in utility thereto, the present apparatus is most effective for extruding material of this nature to form boards and similar products. When employing thermosetting binder, at least some platen heat must be applied, particularly in the initial forming section. Under some conditions, as when extruding products of relatively great thickness, the entire platen length of the machine may be heated.

Reciprocation of the ram is initiated by energizing motor 27, which is effective through V belts 29 to drive the flywheel 30 and its associated bevel pinion 38. Bevel pinion 38 drives the engaged bevel gear 42, and thereby the vertically disposed drive shaft 43, which rotates on a fixed axis and drives the eccentric 46 fixed thereto. The eccentric 46 drives the outer eccentric 48 which is fixedly engaged thereto at a selected position. The double eccentric rotates in slide bushing 52, imparting thereto a circular motion, which is resolved by the slide and crosshead construction into a transverse reciprocation of slide 53 relative to the crosshead 54, and a longitudinal reciprocation of the crosshead 54. As illustrated particularly in Figures 4 and 8, the longitudinal reciprocation of the crosshead is effected by its guide wheels 55, restrained in the grooves 56 of the frame mounted crosshead guides 57.

In the illustration of Figure 6, the eccentrics 46 and 48 are relatively engaged for maximum longitudinal stroke. The relative adjustment of the double eccentric, it will be readily understood, may be varied through a plurality of intermediate adjustments to one in which the outer eccentric is offset relative to the inner eccentric 180° from the illustrated relationship, whereby the double eccentric may be adjusted for minimum stroke. Intermediate lengths of stroke may be effected by suitable selection and alignment of the slots 49 in the meeting surfaces of the eccentrics, and the desired adjustment temporarily fixed by means of the key 50 engaging the aligned slots. In this manner, a wide range of stroke lengths may be provided, which may be, for example, from two to six inches.

The longitudinal reciprocation of the crosshead 54 is transmitted through bracket 59 and ram plate 60 to the ram head 61. At the rearward end of each ram stroke, material from hopper 22 will feed onto the extended rear end 98 of the lower platen 95 of the forming section, immediately in front of the ram, and in its forward stroke the ram will compress such portion of material and force it into the forming section of the machine, whereby a board or similar product is formed by compression in step-by-step fashion in the well understood manner.

The material in feed hopper 22 is normally capable of feeding by gravity. The adjustable extension plate 76, however, may be utilized to compensate for variation in effective density of the feed, and serves to smooth out the normal flow of material to the bottom of the hopper. In operation, the feed members 79 are continuously rotated by motor 80 and the connecting drive. The rotation of the feed members imparts vibration to the hopper, and the multitudinous blades 90 by means of their working faces 91 and 92 and end surfaces 93 impart positive force and impetus to the material to feed it uniformly in downward direction. The provision of at least one feed member 79 rotating in direction opposite to the others is found to effect a mixing and evening of the material fed, and effectively obviates the formation of areas of undue compaction or open areas or pockets in the body of the feed material.

As previously stated, each forward stroke of the ram is effective to compress a portion of feed material, and force it into the forming passage defined by platens 95 of the forming section 24, and the edge formers 102 thereof. The ram head 61 is necessarily dimensioned to conform closely to the space between the platens 95, and in width to the space between the edge formers 102. An outstanding feature of the present invention resides in the relative platen disposition, by means of which a product of outstanding uniformity, strength and other desirable properties is produced. The platen configuration, comprising three distinct sections, and disposition is illustrated diagrammatically in Figure 15 of the drawings. The forming section platens 95 are relatively short, and by way of specific example the upper platen 95 may be twenty to twenty-four inches in length, the lower platen 95 being perhaps six inches longer by reason of its extended rear end 98. The forming section platens 95 are maintained substantially parallel, although under some conditions they are adjusted to converge very slightly from entry to trailing ends thereof.

The platens 95, in conjunction with their edge formers 102, define an initial forming passage in which relatively high pressure is exerted and maintained on the material. This pressure, together with the heat supplied by the platens, is effective to stabilize the product in conforming cross-sectional shape. The trailing opening of the initial forming passage, then, is primarily determinative of the final product dimensions and constitutes a sizing throat of critical dimension. The material emerging from the sizing throat so defined is normally in substantially rigid form, and is thereafter permitted to cure in firmly controlled manner in passage through the succeeding platen sections.

To best effect a controlled cure of the initially formed product, while maintaining the stabilized form thereof, it has been found most effective for the intermediate platens 153 to diverge slightly from entry to trailing ends thereof. The angle of divergence will normally be less than 1°, and will usually be in the neighborhood of 0.5°. The slight divergence results in progressive release of high pressure on the initially stabilized product, which, as contrasted to continued high pressure after initial stabilization, results in a product of superior strength, with more uniform density and surface texture. Obviously, also, the diverging platen sections 153 offer reduced resistance to material passage therethrough, and materially reduce power requirements. The diverging platen sections are yet effective to maintain the initially stabilized product form in curing, and also permit the exit of steam therefrom without damage. For obvious reasons, the entry ends of the platens 153 must be aligned with the trailing ends of forming section platens 95, the divergency being effected by greater spacing between the trailing ends of the platens 153. As previously noted, the intermediate platens are of considerably greater length than are the forming section platens 95, and may be four or five times as long.

The front curing section platens 169 maintain continued control over the substantially cured product emerging from the intermediate platens 153, and afford additional time in passage therethrough for completion of cure, particularly advantageous in forming relatively thick products. The platens 169 are spaced at their entry ends in alignment with the trailing ends of the intermediate platens 153. An outstanding feature of the present invention resides in adjustment of the trailing platens 169 to converge slightly from entry to trailing ends thereof, to effect, at their trailing ends, a restricted exit throat. The angle of convergence of the trailing platens 169 will normally correspond approximately to the angle of divergence of the intermediate platens 153. The restricting effect of the exit throat may be materially enhanced by resiliently deflecting the trailing ends of the platens 169 inwardly, as by means of the coil springs 173 acting against the trailing end of the upper platen 169. The restriction of the exit throat, and particularly the resilient force here exerted, effects a frictional drag force on the cured product, which exerts a limited effect throughout the series of platens, and assists in achieving and maintaining product uniformity.

Since variations in feed, temperature and other factors tend to affect the final dimensions and density of the product, sensitive adjustment means are provided in the apparatus to achieve and maintain outstanding product control. Any variations in final dimension which occur during a continuous run may be compensated for during operation by adjustment of the edge formers of the forming section, by means of lock nuts 106 (Figure 13), as well as by vertical adjustment of the trailing end of the lower forming section 95, by means of the trailing wedge 120. The density of the cured product being extruded may be roughly measured by observing the length of product emerging from platens 169 with each stroke of the ram. Should this indication be a deviation from the established norm, rough adjustment therefor may be accomplished by slight vertical adjustment of the trailing end of lower platen 95. That is, a slight closing of the sizing throat of the forming section may materially affect density, without materially affecting the final product thickness. A final control of density is readily achieved by variation of the drag effect at the trailing end of platens 169. This is accomplished most simply by adjusting the force tending to resiliently restrict the exit throat. In the exemplary embodiment, this involves merely adjustment of the position of collars 172 on rods 171, thereby altering the preloading of the coil springs 173 acting on the trailing end of upper platen 169. Increase in preloading of the coil springs 173 will result in a very slight increase in product density, and correspondingly decrease in preloading in the coil springs will effect a slight decrease in product density. If pneumatic cylinders are employed in place of the coil springs, the pressure effective thereon may be readily varied, as by adjustment of a relief valve.

The ram drive mechanism is massive, being considerably heavier than required for strength alone. The high inertia of the ram drive results in even, smooth compressive strokes on the material, not subject to vibration or sudden accelerations and decelerations. As a consequence, the extruded product is extremely uniform, without variation in density within or between successive portions of material compressed by successive strokes. The eccentric drive, involving the slide and crosshead, is found most suitable for transmitting reciprocatory force to the ram, and enhances smooth acceleration and deceleration during compressive strokes which also contribute to product uniformity.

The present apparatus may be readily adjusted to produce a wide range of product sizes, ranging in thickness for example from one-half inch to two inches, and in width up to four feet. Adjustment for width may be readily accomplished by lateral adjustment of the edge formers 102, or by substitution of edge formers of different dimensions. To change over the machine to different product thickness, it is necessary only to change the ram plate 60, the ram head 61 and the associated slide spacer 62, to elevate or lower the lower platens of the several sections, and to substitute edge formers of proper size. In some cases, it may be desirable also to adjust the stroke of the ram drive.

Such changeover may be accomplished in some cases, particularly when changing to a greater product thickness, without disassembly or clearing of the machine. As appears in Figure 5, the ram bracket 59 is readily accessible, particularly when retracted, and the ram plate, ram head and slide spacer may be readily removed therefrom and replaced by a similar head assembly of desired thickness. The lower platens 95, 153 and 169 may be vertically adjusted simultaneously, by rotation of one shaft 127, by means of a handwheel or crank engaged to the end portion thereof. The rotation of one shaft 127 may be transmitted to all other shafts 127 through the drive wheels 138 and chains 139 and 142, the drive wheels being engaged to the shafts by their dogs 132. In this manner, all three lower platens may be raised or lowered simultaneously, while preserving the relative angular relationship thereof to the upper platens and to each other. After operation is started, individual adjustment of the platens and the inclination thereof may be accomplished during operation, until a stabilized condition yielding the desired product is achieved. Individual adjustment of any lower platen at any support point along its length is readily accomplished by disengaging the involved dog 132 from its drive wheel 138, by moving the dog to its outer position, indicated in dotted lines in Figure 11. Thereupon, the appropriate shaft 127 may be rotated by means of a crank, and the engaged wedge individually adjusted, to individually adjust the vertical disposition of the platen portion thereabove. The indicator dial 149 and pointer 150 at each adjustment station continuously indicate the relative position of the wedge at such station and the platen thereabove, and may be utilized to gauge adjustments. Stabilization of conditions may also involve changing of platen temperatures and/or variation in the platen length heated.

For some changeovers, between runs, and for cleaning, inspection, and other purposes, it may be necessary to clear the machine. To accomplish this, the feed hopper 22 may be emptied merely by stopping the supply thereto, and the ram drive mechanism may be stopped by de-energizing motor 27, and is preferably brought to rest in retracted position. The feed hopper and associated mechanism may then be retracted as a unit, by means of the wheels 69 mounted on its subframe 68, and riding tracks 70. The rearward movement of the hopper unit is limited by the rearward upturned ends 72 of the forward tracks 70. In this position, the hopper gate 73 may be opened, and reasonable access provided therethrough to the interior of the hopper.

The head structures of the forming section and the two curing sections, including the platens supported thereby, may then be readily raised, merely by removing the retaining pins along one side thereof and pivoting the head structures upwardly about the pins on the other side thereof, as previously described. Retraction of the feed hopper to the dotted line position of Figure 1 permits clearance of the forming section head structure 100 in such elevation. The elevated head structures may be engaged and supported in vertical position by the frame brackets 160, by placing pins within the then aligned bracket apertures 162 and yoke arm apertures 163. Material remaining in the forming passage may then be removed, and the necessary cleaning, inspection or other operation proceeded with. With the head structures in open position, the edge formers 102 may be readily adjusted or replaced. Also, the vertical disposition of the lower platens may be adjusted, simultaneously or individually, in the manner previously described. Thereafter, the upper head structures and platens may be pivotally lowered and secured in normal horizontal position, feed of material to the hopper again started, the hopper and ram drives energized, and production may proceed.

The essential conditions for optimum operation are that the forming section platens 95 be parallel or slightly convergent, that the intermediate curing section platens 153 be slightly divergent, and that the front or trailing curing section platens 169 be slightly convergent. For purposes of simplicity of construction and adjustment, in the exemplary embodiment the upper platens are fixed in horizontal relationship, and the desired divergency and convergency, and adjustment are accomplished entirely through the lower platens. As will be evident, however, both upper and lower platens may be made adjustable, both for spacing and angular adjustment. While three platen sections are required, either the lower or upper platen may be unitary. In the illustrative embodiment, for example, the three upper platen sections may be joined together. Similarly, the three lower platen sections may be engaged, as by hinges.

The platens of the machine need not be flat, but may be curved or otherwise shaped across their width, to extrude a product of corresponding non-rectangular shape. Similarly, longitudinal passages may be formed in the product in conventional manner. The volume of production of the machine is high. By way of illustration, extruding a board four feet wide and one inch thick, a ram stroke of from four to six inches and stroke interval of one second or less may be consistently employed with excellent results. On exiting from the trailing platens 169, the product is adequately cured for sawing and/or other subsequent operations.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

I claim:

1. Extrusion apparatus comprising upper and lower platens disposed in vertical spaced relationship, said platens including corresponding entry, intermediate and trailing sections, the entry sections of said platens being substantially parallel, the intermediate sections of said platens being divergent and the trailing sections of said platens being convergent, side members disposed laterally of said platens to define a forming passage therewith, material feeding means associated with the entry ends of said platens, and a reciprocable ram disposed adjacent the entry ends of said platens and adapted to enter therebetween.

2. Extrusion apparatus as defined in claim 1, wherein the entry sections of said platens are very slightly convergent.

3. Extrusion apparatus as defined in claim 1, including means for adjusting the spacing between said platens.

4. Extrusion apparatus as defined in claim 1, including means for individually adjusting the spacing between corresponding sections of said platens.

5. Extrusion apparatus as defined in claim 1, including means for individually adjusting the angular relationship between corresponding sections of said platens.

6. Extrusion apparatus as defined in claim 1, including means for individually adjusting the spacing and the angular relationship between corresponding sections of said platens, said adjustment means including a plurality of wedges disposed transversely at longitudinally spaced points under each platen section, and means for varying the relative lateral position of each wedge.

7. Extrusion apparatus as defined in claim 1, including means for individually adjusting the spacing and the angular relationship between corresponding sections of said platens, said adjustment means including a plurality of wedges disposed transversely at longitudinally spaced points under each platen section, means for varying the relative lateral position of each wedge individually and simultaneously, and means for indicating the relative lateral position of each wedge.

8. Extrusion apparatus as defined in claim 1, including high inertia reciprocating drive means drivingly engaged to said ram.

9. Extrusion apparatus as defined in claim 1, including high inertia reciprocating drive means drivingly engaged to said ram, said drive means comprising a vertically disposed drive shaft, an adjustable double eccentric fixed to said drive shaft, a crosshead mounted for sliding movement in longitudinal direction, and a slide mounted for sliding movement in transverse direction in said crosshead, said double eccentric being rotatably engaged to said slide, and said crosshead being rigidly connected to said ram.

10. Extrusion apparatus comprising upper and lower platens disposed in vertical spaced relationship, said patens including corresponding entry, intermediate and trailing sections, the entry sections of said platens being substantially parallel, the intermediate sections of said platens being divergent and the trailing sections of said platens being convergent, the entry end of said lower platen extending beyond the corresponding end of said upper platen, side members disposed laterally of said platens to define a forming passage therewith, a material feed hopper having a throat at the lower end thereof, said hopper throat being normally disposed in horizontal alignment with said upper platen and above the extending entry end of said lower platen, and a reciprocable ram disposed adjacent the entry ends of said platens and adapted to enter therebetween.

11. Extrusion apparatus as defined in claim 10, wherein said feed hopper comprises a plurality of rotary feed elements extending transversely therethrough, and means for rotating said feed elements in diverse directions.

12. Extrusion apparatus as defined in claim 10, wherein said feed hopper compirses a plurality of rotary feed elements extending transversely therethrough, and means for rotating said feed elements in diverse directions, each of said feed elements being of square cross-sectional configuration within said hopper, and provided with a plurality of blades extending outwardly therefrom in staggered relationship, each blade having opposite working faces generally parallel to the axis of rotation and a sloping outer end surface extending therebetween.

13. Extrusion apparatus as defined in claim 10, wherein said feed hopper comprises a plurality of rotary feed elements extending transversely therethrough, and means for rotating said feed elements in diverse directions, and including means mounting said feed hopper and associated elements for sliding movement as a unit in longitudinal direction, from a normal operative position above the entry end of said lower platen to a position substantially to the rear thereof.

14. Extrusion apparatus as defined in claim 1, including means operative on the trailing end of one of said platens to resiliently deflect said end inwardly toward the corresponding end of the other platen.

15. Extrusion apparatus as defined in claim 1, including spring means operative on the trailing end of the upper platen to resiliently deflect said end downwardly.

16. Extrusion apparatus as defined in claim 1, wherein the entry, intermediate and trailing sections of said upper platent are horizontal and coplanar.

17. Extrusion apparatus as defined in claim 1, wherein the entry, intermediate and trailing sections of said upper platen are pivotally mounted on a longitudinal axis disposed laterally thereof, whereby said platen sections may be pivoted upwardly for access to said forming passage.

18. Extrusion apparatus as defined in claim 1, wherein the entry, intermediate and trailing sections of said upper platen are individually pivotally mounted on a longitudinal axis disposed laterally thereof, whereby said platen sections may be pivoted upwardly for access to said forming passage, and including means for supporting and retaining said platen sections in up position.

19. Extrusion apparatus comprising upper and lower platens disposed in vertical spaced relationship, said platens including corresponding entry, intermediate and trailing sections, the entry sections of said platens being substantially parallel, the intermediate sections of said platens being divergent and the trailing sections of said platens being convergent, means for individually adjusting the spacing and the angular relationship between corresponding sections of said platens, said adjustment means including a plurality of wedges disposed transversely at longitudinally spaced points under each platen section, and means for varying the relative lateral position of each wedge, side members disposed laterally of said platens to define a forming passage therewith, a material feed hopper having a throat at the lower end thereof, said hopper throat being normally disposed adjacent the entry ends of said platens, a plurality of rotary feed elements extending transversely through said hopper, means mounted on said hopper for rotating said feed elements in diverse directions, means mounting said feed hopper and associated elements for sliding movement as a unit in longitudinal direction, a reciprocable ram disposed adjacent the entry ends of said platens and adapted to enter therebetween, and a high inertia reciprocating drive means including an adjustable double eccentric drivingly engaged to said ram.

20. Extrusion apparatus as defined in claim 1, including heating means associated with said platens.

References Cited in the file of this patent

UNITED STATES PATENTS

| 1,603,140 | Muller | Oct. 26, 1926 |
| 2,168,889 | Thomas | Aug. 8, 1939 |
| 2,672,650 | Westerberg | Mar. 23, 1954 |